United States Patent [19]

Fangmann et al.

[11] Patent Number: 4,596,499

[45] Date of Patent: Jun. 24, 1986

[54] CENTER-FREE DRILL

[75] Inventors: Michael D. Fangmann, Bluegrass, Iowa; Robert E. Strange, Grosse Pointe Woods, Mich.; William C. McKay, Seabrook, Tex.

[73] Assignee: Jancy Engineering Company, Davenport, Iowa

[21] Appl. No.: 535,414

[22] Filed: Sep. 26, 1983

[51] Int. Cl.[4] .............................................. B23B 51/04
[52] U.S. Cl. ..................................... 408/206; 408/204; 408/223; 408/703
[58] Field of Search ........................ 408/703, 204-206, 408/67, 118, 223, 224, 203.5, 713, 227-231, 207, 216; 407/53, 56, 58, 60-62; 125/20; 144/20, 21, 23

[56] References Cited

U.S. PATENT DOCUMENTS 4,422,812 12/1983 Linville ........................... 408/713 X

FOREIGN PATENT DOCUMENTS 1568265 4/1969 France .
2100151 12/1982 United Kingdom ................ 408/204

Primary Examiner—Gil Weidenfeld
Assistant Examiner—Steven C. Bishop
Attorney, Agent, or Firm—Robert G. Mentag

[57] ABSTRACT

An annular hole cutter having a shank and an integral cylindrical body provided with a plurality of axially extended cutting teeth which each has an inner cutting edge and an outer cutting edge. The inner and outer cutting edges are equal in radial width and their inner ends meet in a common leading cutter point. The outer and inner cutting edges on each cutting teeth share a substantially mutual radial face.

11 Claims, 6 Drawing Figures

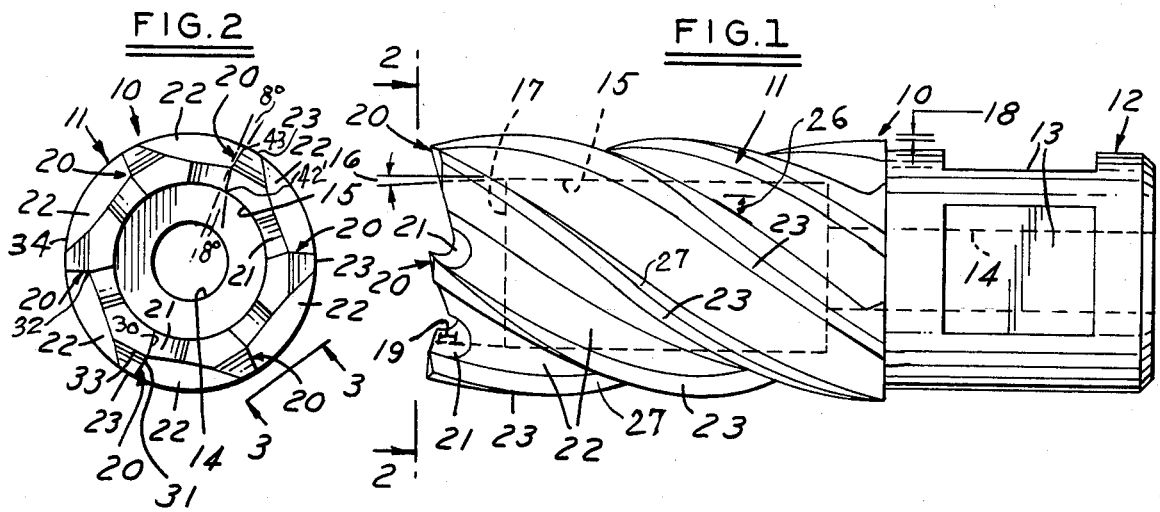
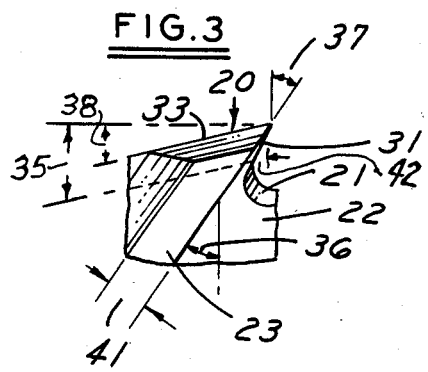
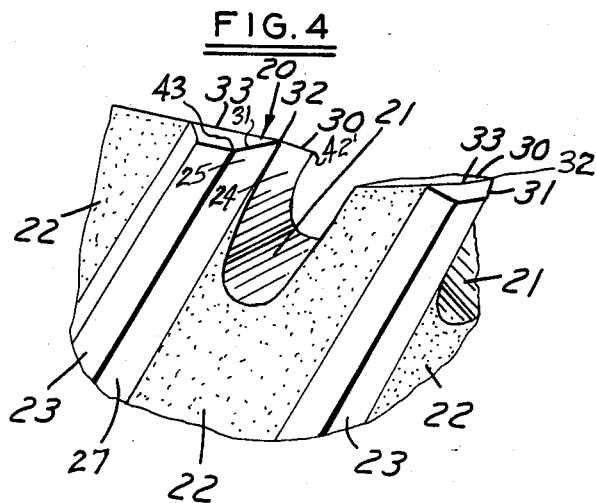
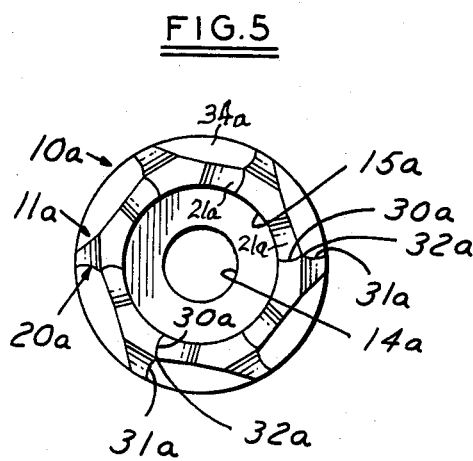
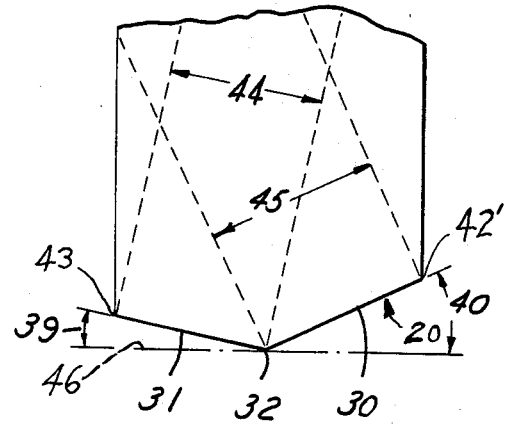

CENTER-FREE DRILL

TECHNICAL FIELD

This invention relates generally to the drill art, and more particularly, to a center-free drill or annular hole cutter. The annular hole cutter includes a plurality of cutting teeth which are mounted around a cylindrical body, and which are each provided with an inner cutting edge and an outer cutting edge.

BACKGROUND ART

It is known in the annular hole cutter art to provide a plurality of cutting teeth, and with each of the cutting teeth being divided into inner and outer cutting edges. Examples of such prior art annular hole cutters are disclosed in U.S. Pat. Nos. 3,609,056; 3,860,354; and U.S. Pat. No. Re. 28,416. A disadvantage of the prior art annular hole cutters disclosed in the aforementioned patents is that they are complicated in structure, and accordingly, expensive to manufacture, and costly to sharpen and maintain. A further disadvantage of the prior art annular hole cutters is that they do not provide a clean cutting action so as to make a clean surfaced bore or hole, because the prior art inner and outer cutter edges do not provide precise complementary cutting actions, which results in a rubbing off or scraping off of the metal, and an inefficient chip breaking and chip flow action. Another disadvantage of the prior art cutter shown in the last mentioned prior art patent is that the leading point, between the inner and outer cutting edges, has a tendency to break down in the early life of the cutter, thus reducing cutter efficiency and cutter life.

DISCLOSURE OF THE INVENTION

In accordance with the principles of the present invention an annular hole cutter is provided which is center-free, and which is provided with a plurality of cutting teeth that are equally spaced circumferentially around an axial end of a cylindrical body. Each cutting tooth has an inner cutting edge and an outer cutting edge. The inner ends of both of the inner and outer cutting edges meet in a central or leading point on the same transverse plane. The leading point of each cutting tooth initiates a cutting action on a workpiece, both axially and circumferentially. The inner and outer cutting edges are arranged and disposed in a novel structural arrangement, as disclosed more fully in detail hereinafter. A gullet is formed between each cutting tooth so as to function with the inner and outer cutting edges of a tooth to move the chips away from the cutting edges, in two directional chip flows which are controlled by three planes, and in a more efficient manner than heretofore achieved in the aforedescribed prior art patents. The annular hole cutter of the present invention provides a clean hole, without any hangup of chips during a hole cutting operation. The annular hole cutter of the present invention operates with a freer cutting action and with less horsepower than heretofore required, and with a minimum breakage of cutting teeth. The annular hole cutter of the present invention is cheaper and easier to maintain and sharpen, than the aforementioned prior art annular hole cutters.

BRIEF DESCRIPTION OF THE DRAWINGS

FIG. 1 is a side elevation view of an annular hole cutter made in accordance with the principles of the present invention.

FIG. 2 is a front end view of the annular hole cutter illustrated in FIG. 1, taken along the line 2—2 thereof, and looking in the direction of the arrows.

FIG. 3 is an enlarged, fragmentary, side elevation view of the annular hole cutter illustrated in FIG. 2, taken along the line 3—3 thereof, and looking in the direction of the arrows.

FIG. 4 is a fragmentary, elevation perspective view of the leading point of the cutting tooth employed in the annular hole cutter structure of the invention, and showing the inner and outer cutting edges.

FIG. 5 is a fragmentary, front end view, similar to FIG. 2, of a modified annular hole cutter and showing a modified cutting tooth employed in the invention.

FIG. 6 is a fragmentary, elevation view of a cutting tooth employed in the invention, and showing the two chip flow paths, and the two directions of chip flow.

BEST MODE OF CARRYING OUT THE INVENTION

Referring to the drawing, and in particular to FIG. 1, the numeral 10 generally designates a center-free annular hole cutter made in accordance with the principles of the present invention. The annular hole cutter 10 includes a cutter body, generally indicated by the numeral 11, and an arbor or shank, generally indicated by the numeral 12. The shank 12 is provided with a standard size, outer diameter for interchangeability with a common drive mechanism. A pair of suitable chucking flats 13, are formed on the periphery of the shank 12 to provide a means for driving the cutter 10 without slippage.

The annular hole cutter shank 12 is provided with an axial bore 14. The axial bore 14 communicates at its inner end with a larger diameter axial bore 15 that is formed through the cutter body 11. It will be understood that the annular hole cutter 10 may be made to any desired length and diameter. In one embodiment the cutter was provided with a shank that was 0.875" long and a cutter body that was 1.500" long. The outer diameter of the shank was 0.750". The outer diameter of the cutter body was 0.812". The bore 14 was 0.250" in diameter, and the bore 15 was 0.522" in diameter. The wall thickness of the cutter body was 0.160". As shown in FIG. 1, the bore 15 has a ¼" long inside diameter step which is indicated by the numeral 17. Said inside diameter step has a 3° backtaper that commences at the cutting end of the cutter body 11, and which is designated by the numeral 16. This inside diameter step backtaper minimizes inside cutting friction.

As shown in FIG. 1, the cutter body 11 is provided with a backtaper 18 of 0.006" per inch. As shown in FIG. 2, the cutting end of the cutter body 11 is provided with six circumferentially spaced apart cutting teeth, which are each generally indicated by the number 20. As shown in FIGS. 1 and 2, the cutting teeth 20 are spaced apart from each other by six longitudinally disposed helixes or helical flutes 22. The helical flutes 22 are separated by longitudinal helix lands 23, the width of each of which is indicated by the numeral 41 in FIG. 3. Each of the helical flutes 22 comprises a 35° helix, which in one embodiment was 0.080" deep and 3/16"–5/16" wide. The helical flutes 22 provide paths on the outside of the cutter body 11 which pull chips up and out of the hole being bored by the annular hole cutter 10.

As shown in FIG. 2, each of the cutting teeth 20 is provided with an inner cutting edge 30 and an outer cutting edge 31. As shown in FIG. 4, the inner cutting edge 30 has a radial face 24, and the outer cutting edge 31 has a radial face 25. Each of the radial faces 24 is formed by a gullet 21 which is milled through the side wall of the cutter body adjacent to the start of the 35° helix for the adjacent helical flute 22. Each of the gullets 21 comprises a ⅛" wide groove with a 1/16" radius milled in the cutter body 11 at a compounded angle of 28° by 45°, and to an axial depth of 0.030", as indicated by the numeral 19 in FIG. 1.

As shown in FIG. 1, the helix angle of 35° for each flute 22 is indicated by the numeral 26. The radial faces 25 of the outer cutting edges 31 are formed by the upper ends of the trailing radial side faces 27 of the flutes 22.

As shown in FIG. 4, the leading cutter point of each of the cutting teeth 20 is indicated by the numeral 32. The radial width of each of the outer cutting edges 31, from the leading cutter point 32, radially outward to the outer side 34 (FIG. 2) of the cutter is 0.080" wide. The radial width of each of the inner cutting edges 30 is also 0.080", and this width is the radial distance measured from the leading cutter point 32 of the inner cutting edge 30 to the periphery of the bore 15.

As shown in FIG. 6, each of the outer cutting edges 31, has a side relief angle which extends radially outward at a preferable angle of about 12°, and it is indicated by the numeral 39. Each of the inner cutting edges 30 has a preferable relief angle of about 25° which extends radially inward, as indicated by the numeral 40. As shown in FIG. 3, each of the outer cutting edges 31 has a back-off relief angle of about 12°, and it is indicated by the numeral 38. Each of the inner cutting edges 30 has a back-off relief angle of about 20°, and it is indicated by the numeral 35. The substantially mutual upper face angle of each of the inner and outer cutting edges 30 and 31 is indicated by the numeral 37 in FIG. 3, and it is about 28°. The lower face angle of each of the inner cutting edges is indicated by the numeral 42, and it is about 28°. The lower face angle of each of the outer cutting edges 31 is about 35° and it is indicated by the numeral 36 in FIG. 3.

The aforementioned dimensions for the various parts of the cutter 10 are typical for a 13/16" diameter annular hole cutter. However, it will be understood that the aforementioned dimensions will vary for other sizes of annular hole cutters. For example, the back-off angle 38 for each of the outer cutting edges 31 may vary in a range from 8° to 15°. The back-off angle 35 for each of the inner cutting edges 30 may vary in a range from 10° to 20°. The lower face angle 42 of the inner cutting edges 30 may vary in a range of from 26° to 32°. The lower face angle 36 of the outer cutting edges 31 may vary in a range of from 30° to 38°. The side relief angle 40 of the inner cutting edges 30 may vary in a range of from 20° to 30°, and the side relief angle 39 of the outer cutting edges 31 may vary in a range of from 7° to 15°. The radius of each of the gullets 21 may vary in a range from 1/16" to 3/32", and each gullet starts axially inward, from the inner end 42' (FIG. 4) of the inner cutting edge 30, a distance of 0.030", at a 28° angle with a 45° incline, and with a 0° radial angle relative to the center line of the cylindrical body 11.

As shown in FIG. 2, the inside point or end 42' of the inner cutting edge 30 is 8° back of a radius line which intersects the leading point 32 of the inner cutting edge 30. The outside point 43 of the outer cutting edge 31 is also 8° back of a radius line which intersects the leading cutter point 32 of the outer cutting edge 31.

In use, the center-free annular hole cutter 10 is operatively mounted in a suitable machine tool, such as a magnetic base drill, and it may be used to cut holes in workpieces in a fast and efficient manner. The annular hole cutter 10 of the present invention is especially adapted for use in construction work where it is necessary to cut large holes in metal construction members, in a fast and efficient manner. It will be seen that due to the novel construction of the inner and outer cutting edges 30 and 31, respectively, of the cutter 10, that the leading cutter point 32 of each cutting tooth 20 initially engages a workpiece. The leading cutter point 32 enters into a workpiece both axially and circumferentially and this is an efficient action because the leading point 32 is the leading initial point which coincides with the separation of cutting forces. The action of having the leading point 32 first engage a workpiece results in an easier and freer cutting action and with less torque than is required in similar prior art cutters. The novel construction of the cutter 10 of the present invention with its leading point 32 also permits the cutter 10 to be manufactured with less thickness in the side walls, which is an advantage and provides an efficient cutting tool of minimum weight. The leading cutter point 32 is not subject to excessive wear since it is surrounded by sufficient mass to dissipate the heat generated during the cutting action, thus increasing tool efficiency and life.

FIG. 6 illustrates the back relief angles 39 and 40 of the outer and inner cutting edges 31 and 30, respectively, and it is the two different planes of the cutting edges 31 and 30, coupled with the fact that the cutter is moving axially into the workpiece surface 46, which provides a three plane chip cutting action that functions to direct the chips in a curling manner through two flow paths, in an axial direction, through one of the helical flutes 22. The chips rolling off the inner cutting edge 30 flow axially upward through a flow path indicated by the numeral 45 in FIG. 6, while the chips formed by the outer cutting edge 31 flow axially upward through a flow path 44.

It has been found that the cutter 10 of the present invention makes a clean hole during the cutting of the same, and that the inner and outer cutting edges 30 and 31, coact with the helical flutes 22 to provide a freer cutting action, with less required horsepower than can be achieved by the prior art annular hole cutters. The annular hole cutter 10 of the present invention provides a clean cut hole with a lower cutting pressure than is required by the prior art annular hole cutters.

FIG. 5 is a fragmentary end view of a modified annular hole cutter 10a made in accordance with the principles of the present invention. In the modified annular hole cutter structure of FIG. 5, the parts of the cutter 10a which are the same as the parts of the annular hole cutter embodiment illustrated in FIGS. 1 through 4, have been marked with the same reference numerals, followed by the small letter "a". In the modified cutter 10a of FIG. 5, each of the outer cutting edges 31a and the inner cutting edges 30a has a slightly concave inward shape on the leading face edge thereof. The cutter 10a of FIG. 5 would have all of the other construction features of the first described cutter 10 of FIGS. 1 through 4.

While it will be apparent that the preferred embodiments of the invention herein disclosed are well calculated to achieve the results aforestated, it will be appreciated that the invention is susceptible to modification, variation and change.

INDUSTRIAL APPLICABILITY

The center-free annular hole cutter of the present invention is adapted for use in industrial stationary or portable drills for producing accurate, burr-free holes through plates of steel, aluminum and other material without the need for pilot holes and reaming, as for example, for use in construction work to cut large holes in metal construction members.

We claim:

1. An annular hole cutter having a shank, and an integral cylindrical body having a free end and an axial bore formed therethrough, characterized in that:
   (a) said cylindrical body is provided with a plurality of circumferentially spaced apart cutting teeth;
   (b) each of said cutting teeth is provided with an inner cutting edge having a radial face and an inner end and an outer end, and an outer cutting edge having a radial face and an inner end and an outer end;
   (c) the inner ends of the inner and outer cutting edges on each cutting tooth meet at a common leading cutter point;
   (d) the inner and outer cutting edges are positioned with the leading cutter point extending axially ahead of the cutting edges;
   (e) the plurality of cutting teeth are circumferentially spaced apart by an equal number of helical flutes which are formed around the periphery of the cylindrical body and which extend longitudinally thereof and have a side face;
   (f) the outer end of each of the inner and outer cutting edges is disposed circumferentially rearward of a radius line which intersects the leading cutter point; and,
   (g) the radial face of each outer cutting edge is formed as a continuation of the side face of one of the helical flutes, at the free end of the cylindrical body, and the radial face of each inner cutting edge is formed at the free end of the cylindrical body by a gullet formed through the body from the axial bore outwardly and communicating with one of the helical flutes, and the radial face angle of the inner cutting edge is different from the radial face angle of the outer cutting edge.

2. An annular hole cutter as defined in claim 1, characterized in that:
   (a) each of the inner and outer cutting edges has a straight leading edge.

3. An annular hole cutter as defined in claim 1, characterized in that:
   (a) each of the inner and outer cutting edges has a concave inward leading edge.

4. An annular hole cutter as defined in either one of claims 2 or 3, characterized in that:
   (a) each of said gullets has a radius selected from the range of 1/16" to 3/32".

5. An annular hole cutter as defined in claim 4, characterized in that:
   (a) the radius of each of said gullets starts axially inward a distance of 0.030" from the inner end of the inner cutting edge, and at a 28° angle with a 45° incline, and with a 0° radial angle relative to the center line of the cylindrical body.

6. An annular hole cutter as defined in claim 5, characterized in that:
   (a) the outer end of each of the inner and outer cutting edges is disposed on an angular line that is disposed at an angle of 8° rearward of said radius line that intersects the leading cutter point.

7. An annular hole cutter as defined in claim 6, characterized in that:
   (a) each of the outer cutting edges has a side relief angle of from 7° to 15° which extends radially outward; and,
   (b) each of the inner cutting edges has a side relief angle of from 20° to 30° which extends radially inward.

8. An annular hole cutter as defined in claim 7, characterized in that:
   (a) each of the outer cutting edges has a back-off angle of from 8° to 15°; and,
   (b) each of the inner cutting edges has a back-off angle of from 10° to 20°.

9. An annular hole cutter as defined in claim 2, characterized in that:
   (a) each of the outer cutting edges has a lower face angle of from 30° to 38°; and,
   (b) each of the inner cutting edges has a lower face angle of from 26° to 32°.

10. An annular hole cutter as defined in claim 9, characterized in that:
    (a) the radial faces of the outer and inner cutting edges comprises a mutual radial face of the outer and inner cutting edges which has a 0° radial angle with the axial center line of the axial bore through the cylindrical body.

11. An annular hole cutter as defined in claim 10, characterized in that:
    (a) each of said helical flutes in a 35° helix.

* * * * *